(12) United States Patent
Hoffman

(10) Patent No.: US 9,981,837 B2
(45) Date of Patent: May 29, 2018

(54) SYSTEMS AND METHODS FOR MOVING A PALLET TRUCK AND RAISING A LOAD

(71) Applicant: Hyster-Yale Group, Inc., Fairview, OR (US)

(72) Inventor: Matthew K. Hoffman, Greenville, NC (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 0 days. days.

(21) Appl. No.: 15/174,716

(22) Filed: Jun. 6, 2016

(65) Prior Publication Data

US 2016/0280523 A1    Sep. 29, 2016

Related U.S. Application Data

(63) Continuation of application No. 14/148,029, filed on Jan. 6, 2014, now Pat. No. 9,376,299.

(60) Provisional application No. 61/750,617, filed on Jan. 9, 2013.

(51) Int. Cl.
| | |
|---|---|
| *B66F 9/24* | (2006.01) |
| *B62B 5/00* | (2006.01) |
| *B62B 3/00* | (2006.01) |
| *B66F 9/075* | (2006.01) |
| *B62B 3/06* | (2006.01) |
| *B62B 5/06* | (2006.01) |

(52) U.S. Cl.
CPC ............... *B66F 9/24* (2013.01); *B62B 3/001* (2013.01); *B62B 3/0612* (2013.01); *B62B 3/0618* (2013.01); *B62B 5/0033* (2013.01); *B62B 5/0069* (2013.01); *B62B 5/063* (2013.01); *B66F 9/0755* (2013.01)

(58) Field of Classification Search
None
See application file for complete search history.

(56) References Cited

U.S. PATENT DOCUMENTS

| | | | |
|---|---|---|---|
| 4,212,375 A * | 7/1980 | Peterson ............... | B66F 9/0755 187/224 |
| 4,266,106 A * | 5/1981 | Fraser ...................... | H01H 3/16 200/47 |
| 2009/0260923 A1 | 10/2009 | Baldini | |

* cited by examiner

*Primary Examiner* — Mussa A Shaawat
*Assistant Examiner* — Kyung J Kim
(74) *Attorney, Agent, or Firm* — Schwabe Williams & Wyatt

(57) ABSTRACT

In some embodiments, a lift actuator is added to a pallet truck to effect initially lifting a load and a traction command effects fully raising the load while a pallet truck moves. In other embodiments, an electronic controller is programmed to effect initially lifting a load when a lift actuator is engaged and to effect fully lifting the load while a pallet truck moves when a traction actuator is engaged.

19 Claims, 7 Drawing Sheets

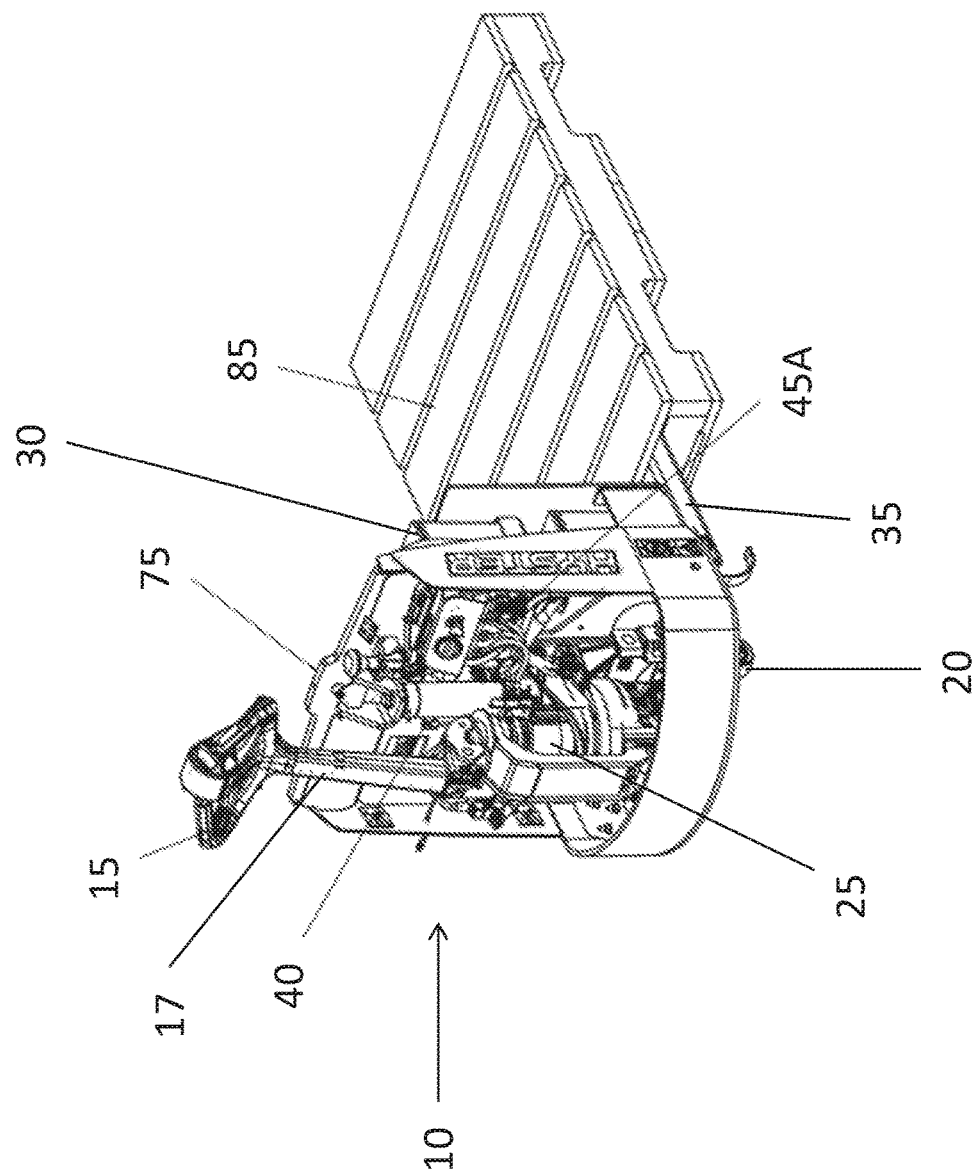

SYSTEMS AND METHODS FOR MOVING A PALLET TRUCK AND RAISING A LOAD

STATEMENT OF RELATED MATTERS

This application is a continuation of U.S. patent application Ser. No. 14/148,029 entitled Systems and Methods for Moving a Pallet Truck and Raising a Load, filed on Jan. 6, 2014, which claims priority to U.S. Provisional Application No. 61/750,617, filed on Jan. 9, 2013; the contents of which are herein incorporated by reference in their entirety.

BACKGROUND

Control handles for walk behind pallet trucks have been economically optimized to facilitate an operator's control of the pallet track and to reduce operator fatigue. Operators commonly operate a pallet truck having a typical control handle to lift a pallet by maneuvering the forks of the pallet truck into position underneath or within the pallet. A lift actuator is then engaged to lift the pallet off the ground, commonly an initial small distance. The pallet truck operator checks to ensure there is no on-coming traffic or other obstacles that could be hit by moving the pallet and pallet truck. The lift actuator is again engaged to fully raise the pallet. After lifting, the operator engages a traction actuator to begin moving the pallet truck and pallet.

SUMMARY

The present inventor has recognized that the common lifting procedure for a pallet truck requires the operator to wait with an immobile pallet truck while the forks raise the pallet, regardless of whether the operator initially raises the pallet a small distance or to the fully raised position before checking for traffic or other obstacles.

The present inventor has also recognized that typical ergonomic designs for common control handles for pallet tracks do not facilitate simultaneous travel and lifting functions to occur, for example, by placing a lift actuator proximate a traction actuator such that both actuators may be engaged simultaneously by an operator while the operator maintains adequate control of the pallet truck with both hands grasping the control handle.

The present inventor has also recognized that pallet truck operations could be made more efficient if an operator could move the pallet truck and raise a pallet simultaneously; preferably while grasping the control handle with both hands.

The present invention therefore provides systems and methods for raising a load of a pallet truck while the pallet truck is moving. Certain embodiments improve operator efficiency by reducing operator motion, input, or both, and by decreasing pallet handling time.

BRIEF DESCRIPTION OF THE DRAWINGS

FIG. 7 illustrates a front right isometric view of the pallet truck of FIG. 6 with its cover removed.

DETAILED DESCRIPTION

Figure 1:
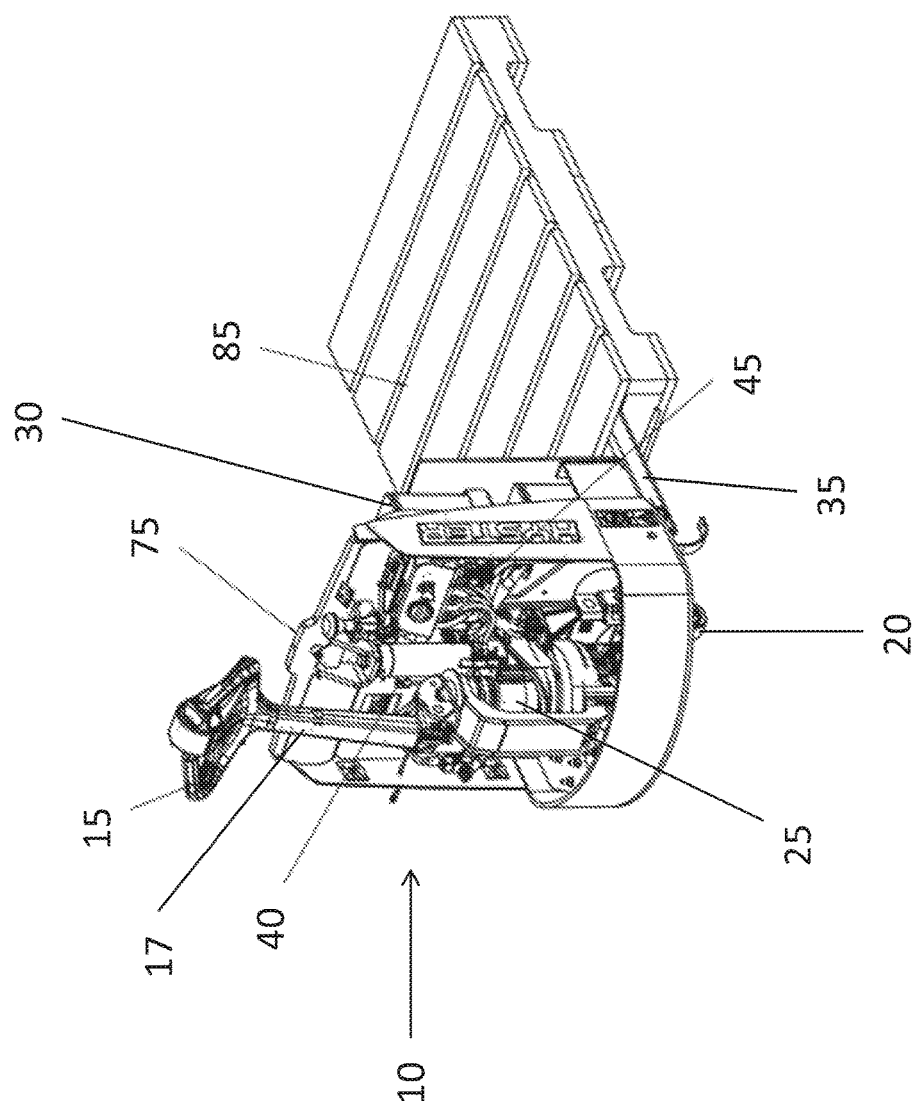
FIG. 1 illustrates a front right isometric view of a pallet truck with its cover removed.

In some embodiments, a lift actuator is added to a pallet truck to effect initially lifting a load and a traction command effects fully raising the load while a pallet truck moves. In other embodiments, an electronic controller is programmed to effect initially lifting a load when a lift actuator is engaged and to effect fully lifting the load while a pallet truck moves when a traction actuator is engaged.

An embodiment is described with reference to FIGS. 1-4. A pallet truck 10 includes a control handle 15 that is attached to a steering arm 17 and is rotated to cause rotation of drive wheel 20 and thus control the direction of travel of pallet truck 10. The pallet truck 10 is moved by a traction motor 25 that is energized by a battery 30. A pair of forks 35 are raised and lowered via a hydraulic cylinder 40. An electronic controller 45 communicates with lift, lower and traction actuators and implements activation of the traction motor 25 and of the hydraulic cylinder 40 in response to receiving commands from the lift, lower and traction actuators.

The control handle 15 includes a horn button 50 (FIG. 4), an emergency reverse button 55, a lift actuator, such as two lift buttons 60, a lower actuator, such as two lower buttons 65, and a traction actuator, such as two rotatable thumb wheels 70 that may be rotated away from the operator, to cause the pallet truck 10 to move away from the operator, or may be rotated towards the operator, to cause the pallet truck 10 to move towards the operator. Other suitable actuators may be used in place of those illustrated in FIG. 4. Two sets of lift buttons 60, lower buttons 65, and rotatable thumb wheels 70 are preferably provided to facilitate operation by either a left or right handed operator.

Figure 3:
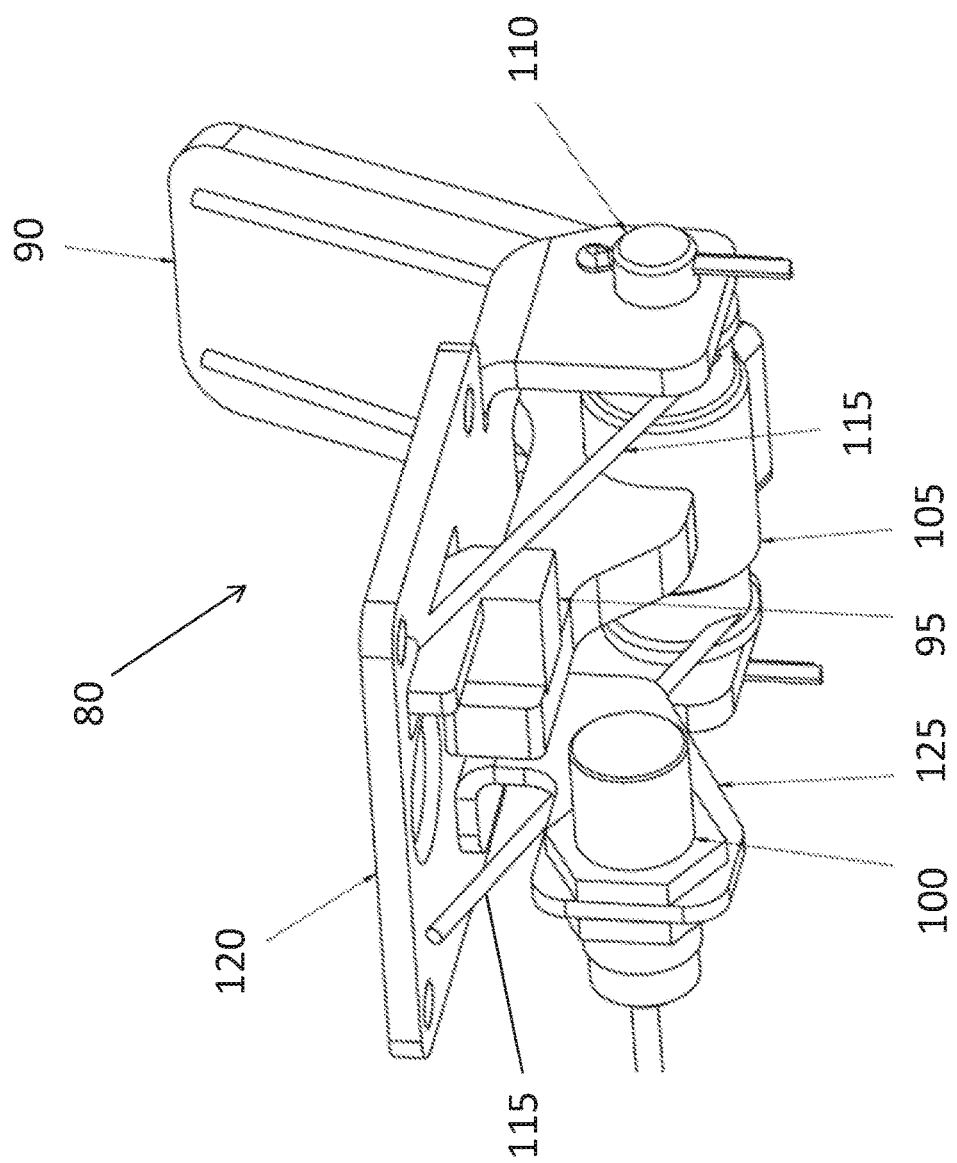
FIG. 3 illustrates a front right isometric view of a switch.
Figure 4:
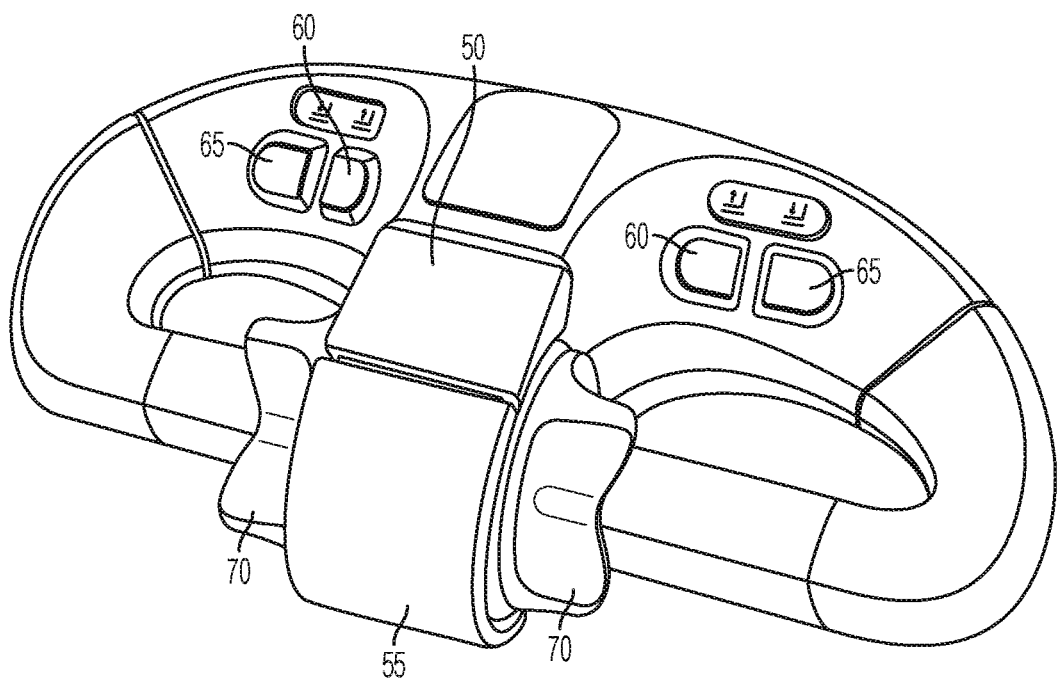
FIG. 4 illustrates a front right isometric view of an economically designed control handle.
Figure 5:
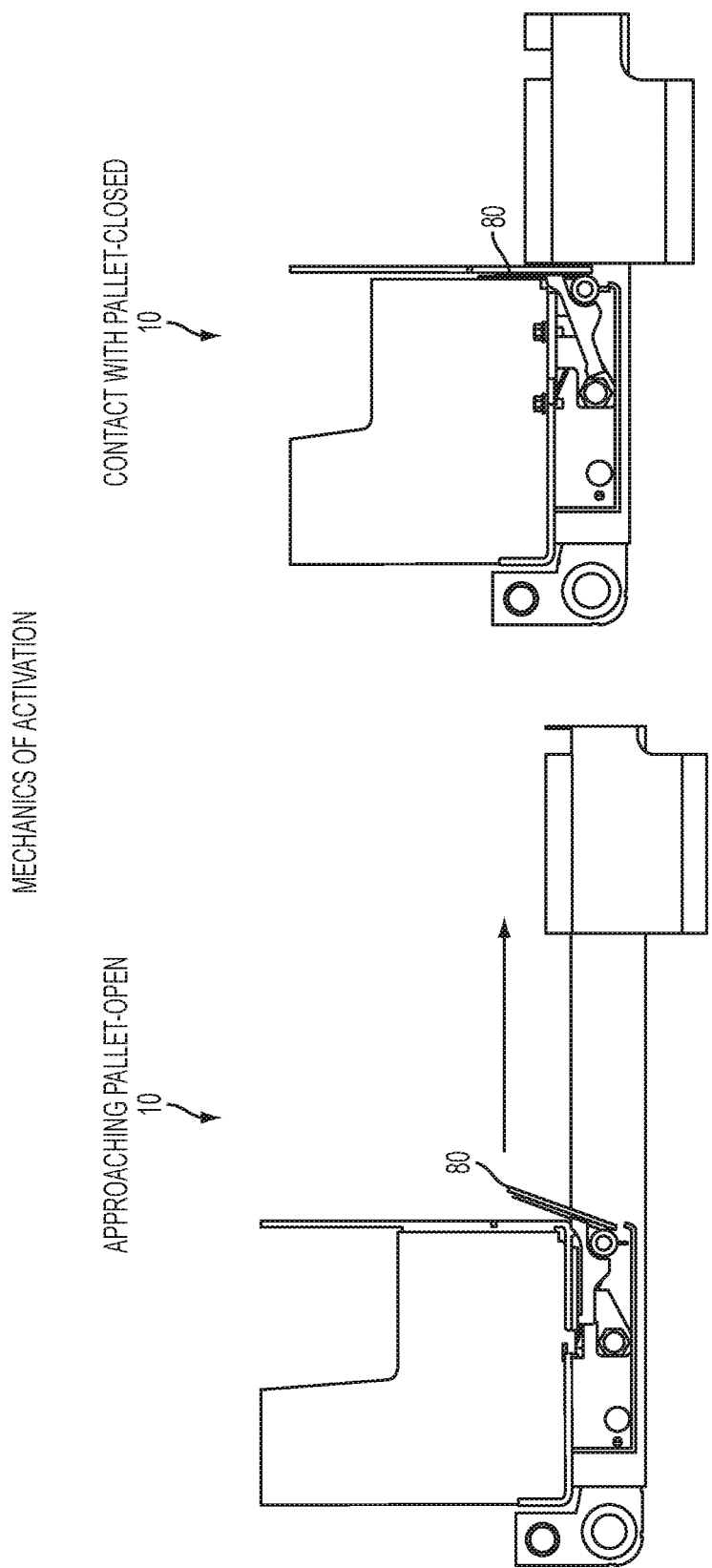
FIG. 5 illustrates a right side sectional view of the pallet truck of FIG. 1 receiving a pallet and triggering the switch of FIG. 3.

An optional second lift actuator is included on the frame 75 of pallet truck 10, however the second lift actuator may be attached to any suitable portion of pallet truck 10, including the forks 35. In the illustrated embodiment, the second lift actuator comprises a switch 80 (FIG. 3). But, the second lift actuator may comprise a sensor, such as an optical sensor, other switches, or other suitable devices to perform the functions of switch 80 described below, such as automatically generating an initial lift command after being triggered or determining that a load is in a suitable position to be lifted.

Figure 2:
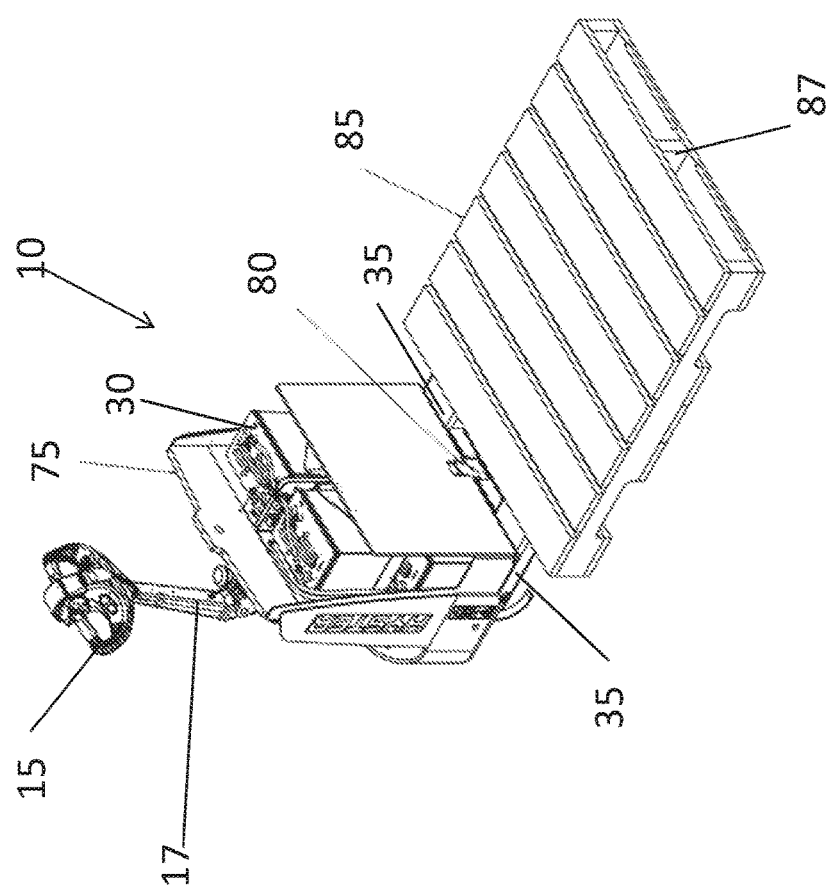
FIG. 2 illustrates a rear right isometric view of the pallet truck of FIG. 1.

To lift a load, an operator maneuvers the forks 35 into or underneath a load, such as pallet 85. Pallet truck 10 is moved toward pallet 85 until a portion of pallet 85, such as the center stringer 87, contacts and moves the activation paddle 90 of switch 80 a sufficient distance for the activation arm 95 to trigger proximity sensor 100. The activation arm 95 is rigidly connected to the activation paddle 90, is made integrally with activation paddle 90, or otherwise suitably connected to move when activation paddle 90 moves. A swivel 105 permits the activation paddle 90 and the activation arm 95 to rotate around a pivot pin 110. Return springs 115 cause activation paddle 90 and activation arm 95 to move to a position where proximity sensor 100 is not triggered when pallet truck 10 moves away from pallet 85. A base 120 supports pivot pin 110, and thus activation paddle 90 and activation arm 95, as well as a proximity switch holder 125. Base 120 is rigidly connected to frame 75 (FIG. 2).

Proximity sensor 100 may include a capacitive, Doppler, eddy-current, inductive, magnetic, laser, photocell, ultrasonic or other suitable sensing device for sensing when activation arm 95 is proximate proximity sensor 100. When proximity sensor 100 detects the presence of the activation arm 95 and is thus triggered, an initial lift command is sent to electronic controller 45 without the operator engaging the lift actuator located on control handle 15. In response to the initial lift command from switch 80, the electronic controller 45 activates a hydraulic system that causes pressurization of hydraulic cylinder 40, thus initially lifting forks 35. Forks 35 are preferably initially lifted a predetermined distance, such as 1 or 2 inches, but hydraulic cylinder 40 may be actuated for a predetermined time, such as 1 or 2 seconds, which may lead to variability in the initial lifting height.

When the operator is ready to raise and move pallet 85 the operator engages the traction actuator, for example, by rotating one of the two rotatable thumb wheels 70. The traction actuator sends a traction command to electronic controller 45 which is programmed, hardwired, or otherwise suitably configured, to energize the traction motor 25 and the hydraulic cylinder 40 simultaneously in response to receiving the traction command after receiving the initial lift command. Preferably, the lift function stops when the forks 35 reach their upper limit of travel, for example, when a full lift sensor sends a signal to electronic controller 45. The operator is thus able to simultaneously move and raise pallet 85 while gripping control handle 15 with both hands and engaging only the traction actuator. Permitting the operator to lift a load and move pallet truck 10 simultaneously without changing hand positions on control handle 15 preferably reduces operator effort to operate pallet truck 10, and permits the operator to retain full control of pallet truck 10.

Figure 6:
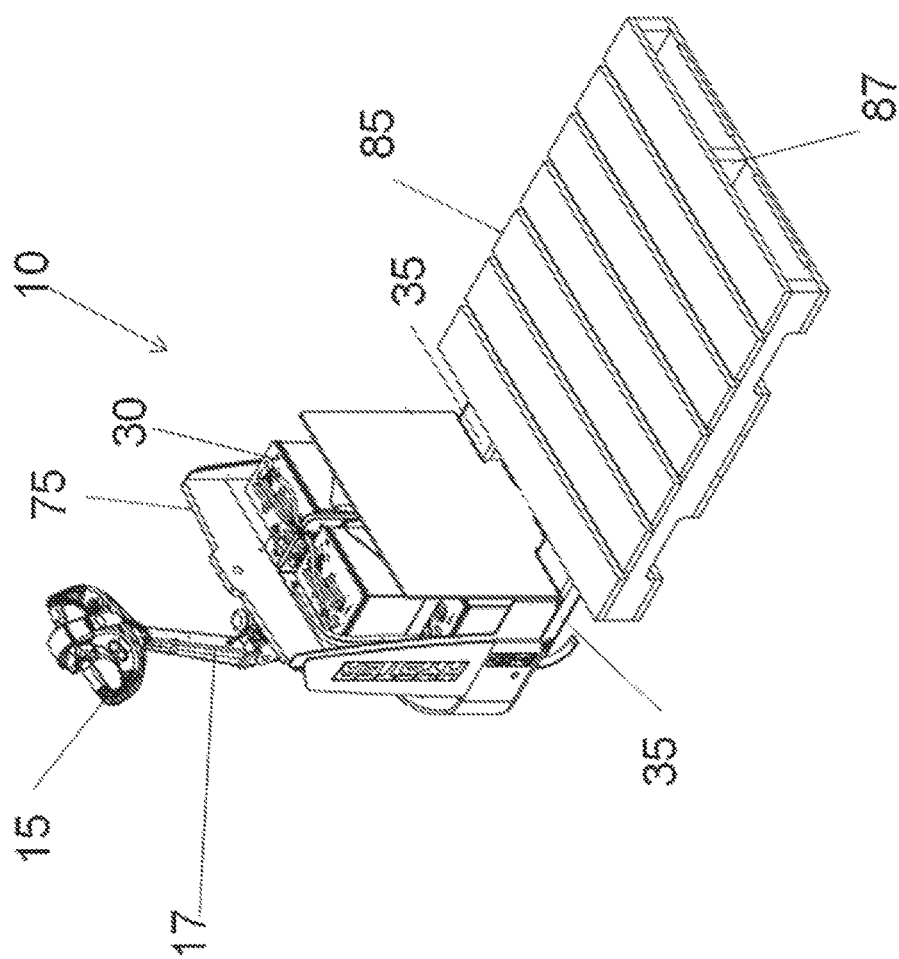
FIG. 6 illustrates a rear right isometric view of another pallet truck.

In other embodiments, a second lift actuator is not included on pallet truck 10 (FIG. 6). To lift a load, an operator maneuvers the forks 35 into or underneath a load, such as pallet 85. The operator then engages the lift actuator located on control handle 15, for example, by pressing and releasing one of the two lift buttons 60, or by pressing and holding one of the two lift buttons 60. Optionally, the lift actuator located on the control handle 15 is operated in a coded manner, such as a single engagement lasting less than a predetermined amount of time, multiple engagements, such as two short engagements in rapid succession, or other suitable coded manner to generate an initial lift command. In response, an initial lift command is sent to electronic controller 45A (FIG. 7). In response to receiving the initial hit command from the lift actuator on the control handle 15, the electronic controller 45A activates a hydraulic system that causes pressurization of hydraulic cylinder 40, thus initially lifting forks 35. Forks 35 are preferably initially lifted a predetermined distance, such as 1 or 2 inches, but hydraulic cylinder 40 may be actuated for a predetermined time, such as 1 or 2 seconds, which may lead to variability in the initial lifting height.

When the operator is ready to raise and move pallet 85 the operator engages the traction actuator, for example, by rotating one of the two rotatable thumb wheels 70. The traction actuator sends a traction command to electronic controller 45A which is programmed, hardwired, or otherwise suitably configured, to energize the traction motor 25 and the hydraulic cylinder 40 simultaneously in response to receiving the traction command after receiving the initial lift command. Preferably, the lift function stops when the forks 35 reach their upper limit of travel, for example, when a full lift sensor sends a signal to electronic controller 45. The operator is thus able to simultaneously move and raise pallet 85 while gripping control handle 15 with both hands and engaging only the traction actuator. Permitting the operator to lift a load and move pallet truck 10 simultaneously without changing hand positions on control handle 15 preferably reduces operator effort to operate pallet truck 10, and permits the operator to retain full control of pallet truck 10.

Optionally, for both of the above-described embodiments, the operator engaging the lower actuator while pallet truck 10 is both moving and raising pallet 85, for example, by pressing and releasing one of the two lower buttons 65, sends a short lower command to the electronic controller 45 or 45A that overrides the lift function and stops the electronic controller 45 or 45A from raising the forks 35. Also optionally, the operator engaging the lower actuator while pallet truck 10 is both moving and raising pallet 85, for example, by pressing and holding one of the two lower buttons 65, sends a lower command to the electronic controller 45 or 45A that overrides the lift function and causes the electronic controller 45 or 45A to lower die forks 35. Subsequent engagement of the traction actuator for both of the above options preferably does not cause die electronic controller 45 or 45A to raise the forks 35. In other embodiments, subsequent engagement of the traction actuator for both of the above options preferably does cause the electronic controller 45 or 45A to raise the forks 35 if the forks 35 have reached their lowermost position before the traction actuator is engaged. Another optional feature is to include a setting that disables the initial lift function, the simultaneous move and lift function, or both, for example, by sending a coded signal to electronic controller 45 using either the lift or lower actuator on the control handle 15.

In other embodiments, an auto-lift kit is used to upgrade existing pallet trucks to have the above-described functionality. One such auto-lift kit includes either replacing an electronic controller in a pallet truck, or re-programming the electronic controller in a pallet truck to carry out the operations described with respect to electronic controller 45A above. Another such auto-lift kit includes (1) a second lift actuator configured to be attached to a pallet truck, for example, on the frame such as between the forks, on the forks, or on another suitable location for determining when the forks are suitably engaging a pallet to be lifted and for sending an initial lift command to an electronic controller, and (2) either replacing an electronic controller in a pallet truck, or re-programming the electronic controller in a pallet truck to carry out the operations described with respect to electronic controller 45 above.

The systems and apparatuses described above can use dedicated processor systems, micro controllers, programmable logic devices, or microprocessors that perform some or all of the operations. Some or all of the operations described above may be implemented in software, hardware or a combination of both.

Having described and illustrated the principles of the invention in preferred embodiments thereof, it should be apparent that die invention may be modified in arrangement and detail without departing from such principles. I claim all modifications and variation coming within the spirit and scope of the following claims.

The invention claimed is:

1. A proximity detection system for a pallet truck comprising:
   a base configured to mount the proximity detection system to the pallet truck at a position adjacent to a first end of forks for lifting a pallet, wherein the first end of the forks is coupled with the pallet truck and the forks further include a second end opposite the first end;

a paddle rotationally connected to the base and configured to rotate when the paddle comes into contact with the pallet;
a switch configured to generate a signal in response to the rotation of the paddle; and
an electronic controller communicatively coupled to the switch, wherein in response to receiving the signal the electronic controller commands the pallet truck to lift the pallet by an initial predetermined distance from ground.

2. The proximity detection system of claim 1, wherein the base is configured to mount the proximity detection system to a frame of the pallet truck.

3. The proximity detection system of claim 2, wherein the base is configured to be mounted to a portion of the frame located between the forks.

4. The proximity detection system of claim 3, wherein the paddle is configured to contact a central stringer of the pallet.

5. The proximity detection system of claim 1, wherein the base is configured to mount the proximity detection system to a fork of the pallet truck.

6. The proximity detection system of claim 1, wherein the switch comprises a proximity sensor configured to detect the rotation of the paddle relative to the base.

7. The proximity detection system of claim 1, wherein the electronic controller is communicatively coupled to a lift actuator, and wherein the electronic controller is further configured to:
maintain a stationary height of the pallet at the predetermined distance of approximately two inches or less;
receive a subsequent lift command from the lift actuator; and
raise the pallet above the predetermined distance in response to receiving the subsequent lift command.

8. The proximity detection system of claim 1, wherein the electronic controller is communicatively coupled to a traction actuator, and wherein the electronic controller is further configured to:
maintain a stationary height of the pallet at the predetermined distance;
receive a traction command from the traction actuator; and
both energize a traction motor and raise the pallet above the predetermined distance in response to receiving the traction command to effect simultaneous movement of the pallet truck and additional lifting of the pallet.

9. The proximity detection system of claim 8, wherein the electronic controller is communicatively coupled to a lift actuator, and wherein the electronic controller is further configured to:
receive a coded signal from the lift actuator; and
disable the simultaneous movement of the pallet truck and additional lifting of the pallet in response to receiving the coded signal, wherein in response to receiving the traction command the electronic controller is instead configured to energize the traction motor without the additional lifting of the pallet.

10. The proximity detection system of claim 9, wherein the coded signal comprises two short engagements of the lift actuator in rapid succession that are received prior to generation of the signal by the switch.

11. The proximity detection system of claim 1, wherein the electronic controller is communicatively coupled to a lift actuator, and wherein the electronic controller is further configured to:
receive a coded signal from the lift actuator; and
disable the initial lifting of the pallet to the predetermined distance in response to receiving the coded signal.

12. The proximity detection system of claim 11, wherein the coded signal comprises two short engagements of the lift actuator in rapid succession that are received prior to generation of the signal by the switch.

13. A method of detecting the proximity of a pallet, comprising:
receiving, by an electronic controller, a traction command from a traction actuator;
energizing a traction motor in response to receiving the traction command to move a pallet truck towards the pallet so as to engage one or more forks of the pallet truck with the pallet, wherein the forks have a first end coupled with a frame of the pallet truck and a second end opposite the first end;
detecting, by the electronic controller, a rotation of a paddle operably coupled to the pallet truck adjacent to the first end of the forks, the paddle configured to rotate when the paddle comes into contact with the pallet; and
lifting the one or more forks by an initial predetermined distance from ground in response to detecting the rotation of the paddle.

14. The method of claim 13, wherein the electronic controller is communicatively coupled to a lift actuator, and wherein the method further comprises:
maintaining a stationary height of the one or more forks at the predetermined distance of approximately two inches or less;
receiving, by the electronic controller, a subsequent lift command from the lift actuator; and
raising the one or more forks above the predetermined distance in response to receiving the subsequent lift command.

15. The method of claim 13, wherein the electronic controller is communicatively coupled to a traction actuator, and wherein the method further comprises:
maintaining a stationary height of the one or more forks at the predetermined distance;
receiving, by the electronic controller, a traction command from the traction actuator; and
both energizing a traction motor and raising the one or more forks above the predetermined distance in response to receiving the traction command to effect simultaneous movement of the pallet truck and additional lifting of the one or more forks.

16. The method of claim 15, wherein the electronic controller is communicatively coupled to a lift actuator, and wherein the method further comprises:
receiving, by the electronic controller, a coded signal from the lift actuator; and
disabling the simultaneous movement of the pallet truck and additional lifting of the one or more forks in response to receiving the coded signal.

17. The method of claim 16, wherein the coded signal comprises two short engagements of the lift actuator in rapid succession that are received by the electronic controller prior to detecting the rotation of the paddle.

18. The method of claim 13, wherein the electronic controller is communicatively coupled to a lift actuator, and wherein the method further comprises:
receiving, by the electronic controller, a coded signal from the lift actuator; and
disabling the lifting of the one or more forks to the initial predetermined distance in response to receiving the coded signal.

19. The method of claim 18, wherein the coded signal comprises two short engagements of the lift actuator in rapid succession that are received by the electronic controller prior to detecting the rotation of the paddle.

* * * * *